(12) United States Patent
Cheng

(10) Patent No.: US 8,054,338 B2
(45) Date of Patent: Nov. 8, 2011

(54) METHOD FOR DETERMINING LUMINANCE THRESHOLD VALUE OF VIDEO REGION AND RELATED APPARATUS

(75) Inventor: Ting-Yuan Cheng, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 433 days.

(21) Appl. No.: 12/423,808

(22) Filed: Apr. 15, 2009

(65) Prior Publication Data
US 2010/0201849 A1 Aug. 12, 2010

(30) Foreign Application Priority Data
Feb. 6, 2009 (TW) .............................. 98103831 A

(51) Int. Cl.
*H04N 5/228* (2006.01)
*H04N 9/10* (2006.01)
(52) U.S. Cl. ..................... 348/222.1; 348/169
(58) Field of Classification Search ............... 348/223.1, 348/224.1, 226.1, 229.1, 157, 155, 169, 154, 348/143, 208.14, 222.1, 246, 247, 2; 382/103
See application file for complete search history.

(56) References Cited

U.S. PATENT DOCUMENTS

| | | | |
|---|---|---|---|
| 7,010,047 B2 * | 3/2006 | Amara et al. | 375/240.29 |
| 7,227,893 B1 * | 6/2007 | Srinivasa et al. | 375/240.08 |
| 7,660,518 B2 * | 2/2010 | Sasaki | 396/121 |
| 2008/0043120 A1 * | 2/2008 | Mitsunaga | 348/238 |

* cited by examiner

*Primary Examiner* — David Ometz
*Assistant Examiner* — Ahmed A Berhan
(74) *Attorney, Agent, or Firm* — Winston Hsu; Scott Margo

(57) ABSTRACT

A method for determining a luminance threshold value of a video region includes: performing a plurality of luminance threshold value generation operations on the video region included in a plurality of video frames, respectively. Each luminance threshold value generation operation includes: generating a total luminance value according to a plurality of luminance values of a plurality of pixels in the video region; subtracting a current luminance threshold value temporarily stored in a register from the total luminance value to generate a luminance error value; performing a specific filtering operation on the luminance error value to generate a filtered luminous error value; accumulating the filtered luminance error value to generate an accumulation result; and updating the current luminance value in the register according to the accumulation result and a luminance approximative value.

20 Claims, 7 Drawing Sheets

METHOD FOR DETERMINING LUMINANCE THRESHOLD VALUE OF VIDEO REGION AND RELATED APPARATUS

BACKGROUND OF THE INVENTION

1. Field of the Invention

The present invention relates to motion detection, and more particularly, to a method and a related apparatus for determining a luminance threshold value of a video region. As a result, the luminance threshold value can further be utilized for establishing a background model of the video region, and can therefore be a criterion for motion detection.

2. Description of the Prior Art

Motion detection is a technique that determines whether moving objects exist in a video sequence and then tracks the moving objects, analyzing motion of the moving objects by means of detecting difference of video frames. This technique is widely applied in many fields, such as professional sport games, security systems and military surveillances.

In the conventional art, a method for detecting motion called background model method is popular. This method establishes a background model in the video sequence in advance and then separates the moving object from the video frame. The background model method firstly divides each frame into a fixed number of video regions, and generates a luminance threshold value of each video region. The generated luminance threshold values of the video regions are utilized as criterions for detecting the moving object(s) in the video sequence. Thus, when a total luminance value of the video region changes (e.g. the total luminance value of this video region is different between two contiguous video frames), and a difference between the change of the total luminance value and the luminance threshold value is higher than a certain amount, it is considered that there is a moving object existing in/passing through this video region. Then, by analyzing all the video regions that are judged as having a moving object existing in/passing through, the moving object can be picked up from the video sequence. The most often seen method for generating the luminance threshold value is that which samples the total luminance value of the video region in a certain period, and then obtains a relative steady level of the total luminance value in this period. This level of the total luminance value is utilized as the luminance threshold value within the period and as a criterion for determining whether a moving object exists in/passes through the video region. To obtain the luminance threshold value, the total luminance is sampled in this period, and after the period ends, all sampling results are averaged for representing the level of the total luminance value during the period. To exactly show the changes of the background model, this luminance threshold value needs to be updated often so that motion detection can be correctly performed when the background changes. The process regarding the aforementioned description is already summarized into steps 110-114 shown in FIG. 1. A detailed description is omitted here since these contents should be well known to those skilled in the art.

Hardware costs are considerable in the conventional art, wherein most hardware costs relate to storage apparatus used for recording each sampled result. For example, the luminance threshold value of a video region is attempted to be updated every 10 seconds, and the total luminance value is sampled 30 times in a second (that is, in a video device capable of generating 30 frames per second, the total luminance value of the video region is sampled for each frame). As for each video region, 300 storage spaces (e.g. register file) are needed for recording each sampled result, and also, an averaging circuit is necessary for generating the luminance threshold value of the video region. In addition, most of the hardware costs are consumed by the storage apparatus since the precision of the average calculation results from the sampling time and sampled data. If the sensitivity of the motion detection needs to be enhanced, the hardware costs of the conventional method will increase considerably.

SUMMARY OF THE INVENTION

To decrease hardware costs of the storage apparatus used in the conventional background model method, an innovative method and related apparatus for generating the luminance threshold value of the background model are provided. By means of combining a phase lock loop (PLL) circuit and a fast approximation technique which makes the luminance threshold value properly respond to the changes of the total luminance value in each video region, the luminance threshold values of each video region that pertinently reflect the actual background in a video sequence are therefore generated.

Specifically, the concept of the present invention is to replace the conventional method of generating the luminance threshold value by gathering the statistic data corresponding to the total luminance value of each video region in a certain period. To realize this concept, the present invention mainly utilizes the luminance approximative value to roughly approximate the luminance threshold value, and then utilizes the PLL technique to increase the precision of the luminance threshold value approximated by the luminance approximative value. Also, via the low-pass filtering provided by the PLL circuit, the present invention not only can obtain a luminance threshold value that is not interfered with by instantaneous motions or noises, but can also steadily change the luminance threshold value output by the PLL circuit in response to the changes in the background.

According to one exemplary embodiment of the present invention, a method for determining a luminance threshold value of a video region is provided. The video region includes a plurality of pixels, and each pixel corresponds to a luminance value. The method comprises respectively performing a plurality of luminance threshold value generation operations upon the video region between a plurality of video frames, wherein each luminance threshold value generation operation includes: generating a total luminance value of the video region according to the plurality of luminance values corresponding to the plurality of pixels; subtracting a current luminance threshold value temporarily stored in a register from the total luminance value to generate a luminance error value; performing a specific filtering operation upon the luminance error value to generate a filtered luminance error value; accumulating the filtered luminance error value to generate an accumulation result; and updating the luminance threshold value temporarily stored in the register according to a luminance approximative value and the accumulation result.

According to another exemplary embodiment of the present invention, an apparatus for determining a luminance threshold value of a video region is provided. The video region includes a plurality of pixels, and each pixel corresponds to a luminance value. The apparatus respectively performs a plurality of luminance threshold value generation operations upon the video region between a plurality of video frames, wherein the apparatus comprises: a total luminance value calculation unit, for generating total luminance value of the video region according to the plurality of luminance values corresponding to the plurality of pixels in each luminance threshold value operation generation; a total luminance value register unit, for temporarily storing the total luminance value generated by the total luminance value calculation unit; an error calculation unit, coupled to the total luminance value register unit, for subtracting a current luminance threshold value stored in an output register unit from the total luminance value to generate a luminance error value; a specific filtering unit, coupled to the error calculation unit, for performing a specific filtering operation upon the luminance error value to generate a filtered luminance error value; an accumulation unit, coupled to the specific filtering unit, for accumulating the filtered luminance error value to generate an accumulation result; an update processing unit, coupled to the accumulation unit, for updating the current luminance threshold value temporarily stored in the output register unit according to the accumulation result and a luminance approximative value; and an output register unit, coupled to the update processing unit, for temporarily storing the current luminance threshold value in each luminance threshold value generation operation performed by the apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
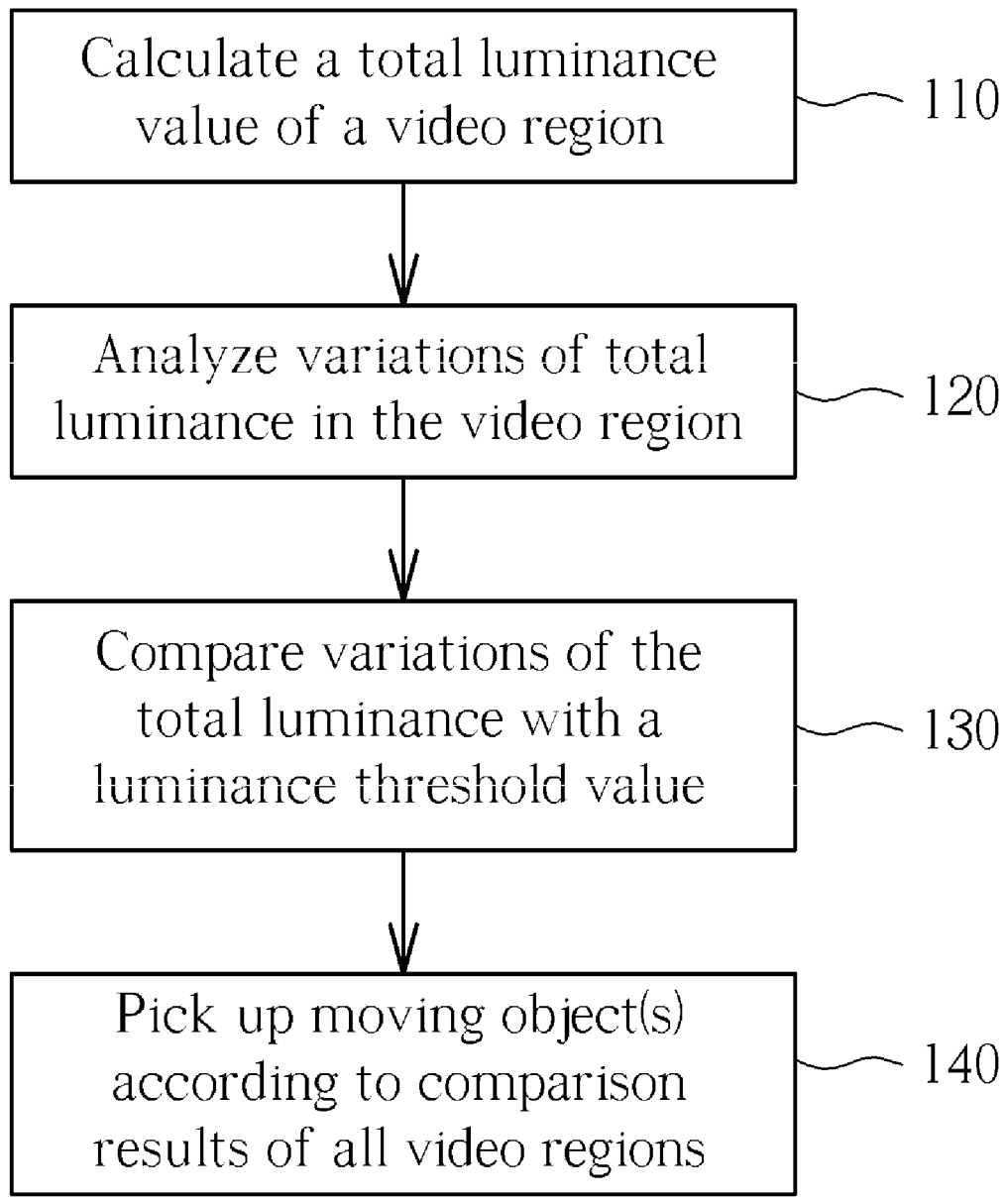
FIG. 1 is a flow chart showing operations of a conventional motion detection method.
Figure 2:
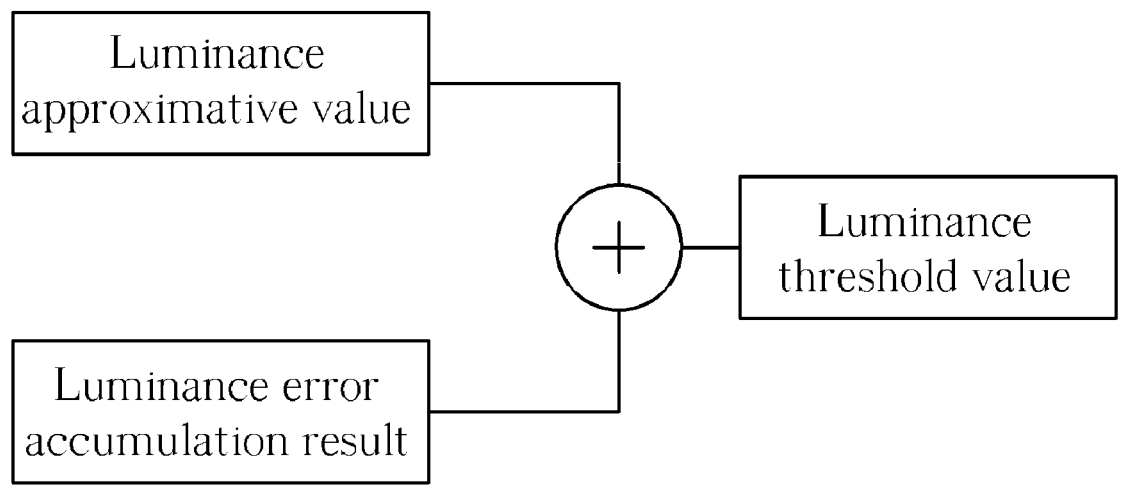
FIG. 2 is a computational diagram of the luminance threshold value according to one exemplary embodiment of the present invention.

To respond to the changes in the total luminance value caused by different conditions, the luminance threshold value is composed of two numerical value components in the present invention. Please refer to FIG. 2, which illustrates a computation of the luminance threshold value according to one exemplary embodiment of the present invention. As shown in FIG. 2, in this exemplary embodiment, the luminance threshold value includes two main numerical value components, which are a luminance approximative value and a luminance error accumulated result. The luminance approximative value is relatively close to the current total luminance value, which is an averaged luminance value derived by averaging a current total luminance value and a previous averaged total luminance value. Please note that the terms "current" and "previous" are meant to distinguish a same total luminance value between different timings or different frames. Thus, the previous averaged total luminance value is derived by averaging the previous total luminance value in the previous frame and the previous averaged total luminance value generated before the previous frame. In short, the luminance approximative value is repeatedly updated by averaging a current total luminance value and a previous averaged result. When the total luminance value tends to be steady, the current luminance approximative value will accordingly be updated by the currently calculated averaged luminance value. Thus, in most conditions, the luminance approximative value is very close to the current total luminance value.

The luminance error accumulation result is obtained by inputting the total luminance value into the PLL circuit. Via properly adjusting the parameters and the structure of the PLL circuit, each input total luminance value is performed upon a subtracting calculation with the addition of the current luminance approximative value and the previous luminance error accumulation result rather than only with the luminance error value generated in the previous PLL operation. In other words, by utilizing the PLL circuit, the luminance threshold value gradually approaches the actual total luminance value of the video region. Through the low-pass filtering of the PLL circuit, the output of the PLL circuit gradually varies in response to the background model, and the interferences caused by high frequency noises and instantaneously moving objects can therefore be excluded.

The reason that the luminance threshold value is designed to be composed of the luminance approximative value and the luminance error accumulation result is detailed more clearly in the following.

Figure 3A:
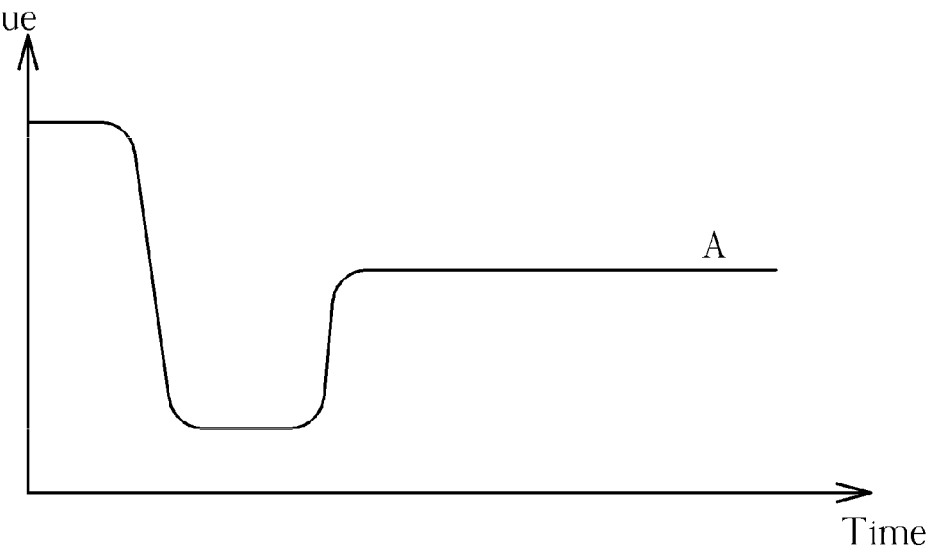
FIG. 3A is a diagram showing different changing types of the total luminance values in the video region.
Figure 3A:
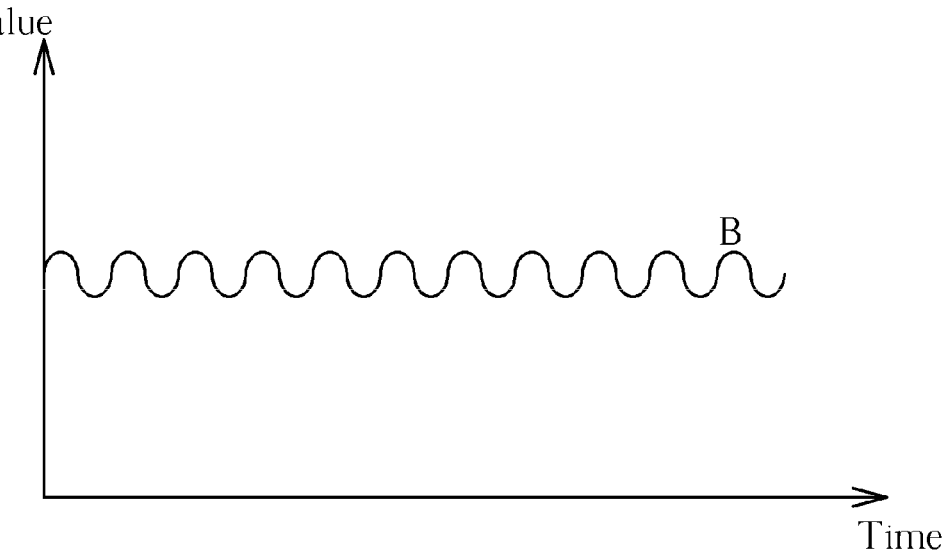

Please refer to FIG. 3A, which illustrates two different types of changes regarding the total luminance value in the video region due to different types of physical phenomena. As shown in FIG. 3A, compared to curve B, curve A has fewer variations, but has a large scale variation. However, after the large scale variation ends, curve A remains steady for a long period. Conversely, small scale variations frequently occur in curve B. These two different types of changes regarding the total luminance value can be considered as being caused by different physical phenomena. The phenomena that may cause the total luminance value to change as in curve A include the cases such as an indoor lamp is turned off for a long time and then is turned on again, or a new background object is added in the video region and an old background object is removed from the video region, thereby causing the considerable changes of the total luminance value. These physical phenomena are generally considered as conditions where the background of the video region indeed changes, and these changes need to be reflected upon the luminance threshold value for correctly performing motion detection.

Figure 3B:
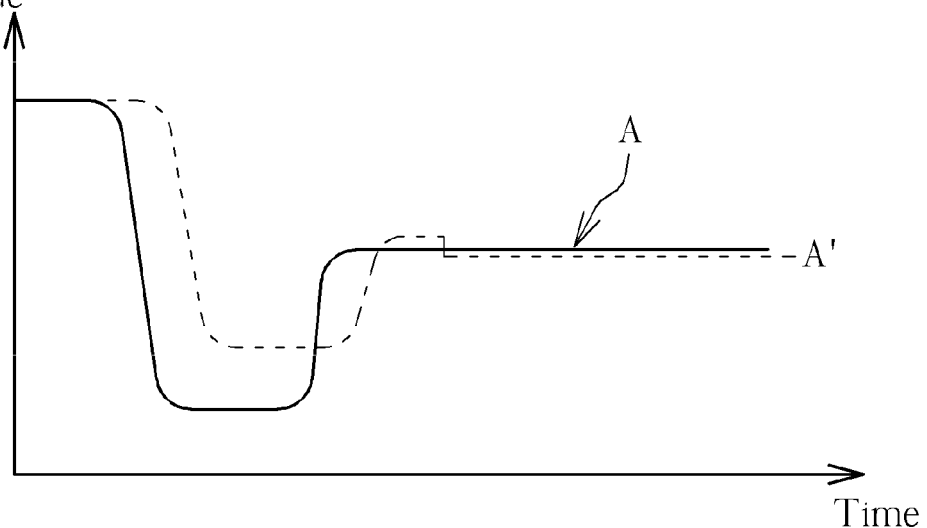
FIG. 3B is a diagram of the generated luminance threshold values according to different changing types of the total luminance values as shown in FIG. 3A.
Figure 3B:
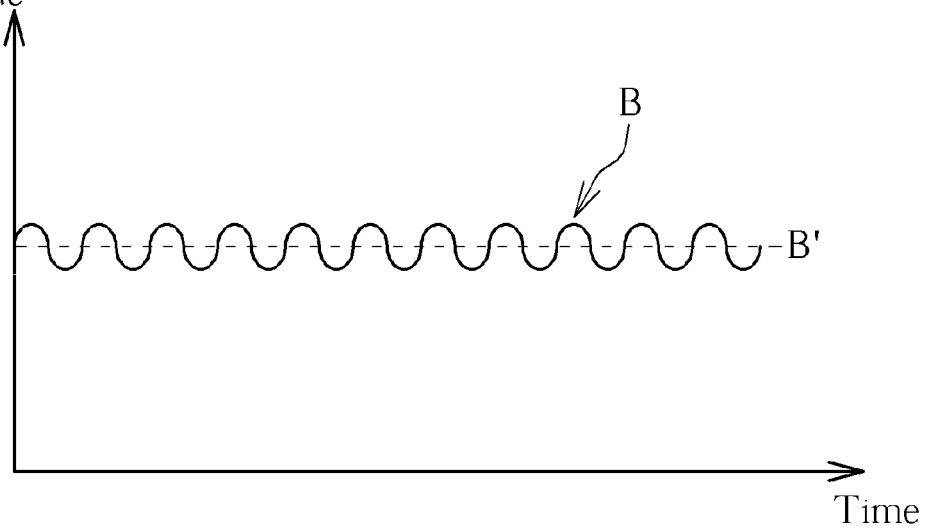

Furthermore, the physical phenomena that may cause the total luminance value to change as in curve B include the cases where a moving object repeatedly moves to and fro in the video region, or a light source glitters in the video region, which should not be considered as the background of the video region changes. Thus, on the premise of establishing a steady background model, an ideal method for generating the luminance threshold value must be able to exclude influences caused by those conditions regarding the variations in curve B, and properly adjust the generation of the luminance threshold value in response to the influences caused by those conditions that cause the variation in curve A. Therefore, the relationship between the total luminance value and the luminance threshold value generated by an ideal method should be the same as shown in FIG. 3B. Please refer to FIG. 3B, wherein curve A represents the changes of the total luminance value, and curve A' represents the luminance threshold value generated by the ideal method. As shown in FIG. 3B, the physical phenomena corresponding to the variation of curve A should be reflected by the ideal luminance threshold value generation method. Thus, for the ideal luminance threshold value generation method, the generated luminance threshold value should vary as shown in curve A'. Similarly, the ideal luminance threshold value generation method should be immune to excessively frequent variations (like those appearing in curve B) so that a steady background model can be established. Thus, the luminance threshold value generated by the ideal luminance threshold value generation method should vary as shown in curve B', i.e. no continuous and fast variations.

As mentioned above, to make the luminance threshold value have a different response according to different types of changes in the total luminance value (e.g. curve A and curve B), the present invention generates the luminance threshold value with two numerical value components. To be immune to the frequent variations in curve B, the luminance approximative value which is the greater portion of the luminance threshold value is configured to be updated as soon as the total luminance value approaches a steady state so as to make the luminance approximative value close to the current total luminance value. As a result, the luminance threshold value generated by the present invention not only can be immune to the frequent variations like those in curve B, but can also properly respond to the steady variation of curve A. When the luminance approximative value roughly approximates to the steady total luminance value, the PLL circuit generates the tiny variation of the total luminance value to generate the luminance error accumulation result, and then the luminance error accumulation result is added to the luminance approximative value so that the luminance threshold value which is most suitable to reflect the current background model can be generated. By properly designing the parameters of the PLL circuit, the luminance error accumulation result will not be heavily influenced by the excessively frequent variations of the total luminance value but instead can respond to the steady total luminance value.

Figure 4:
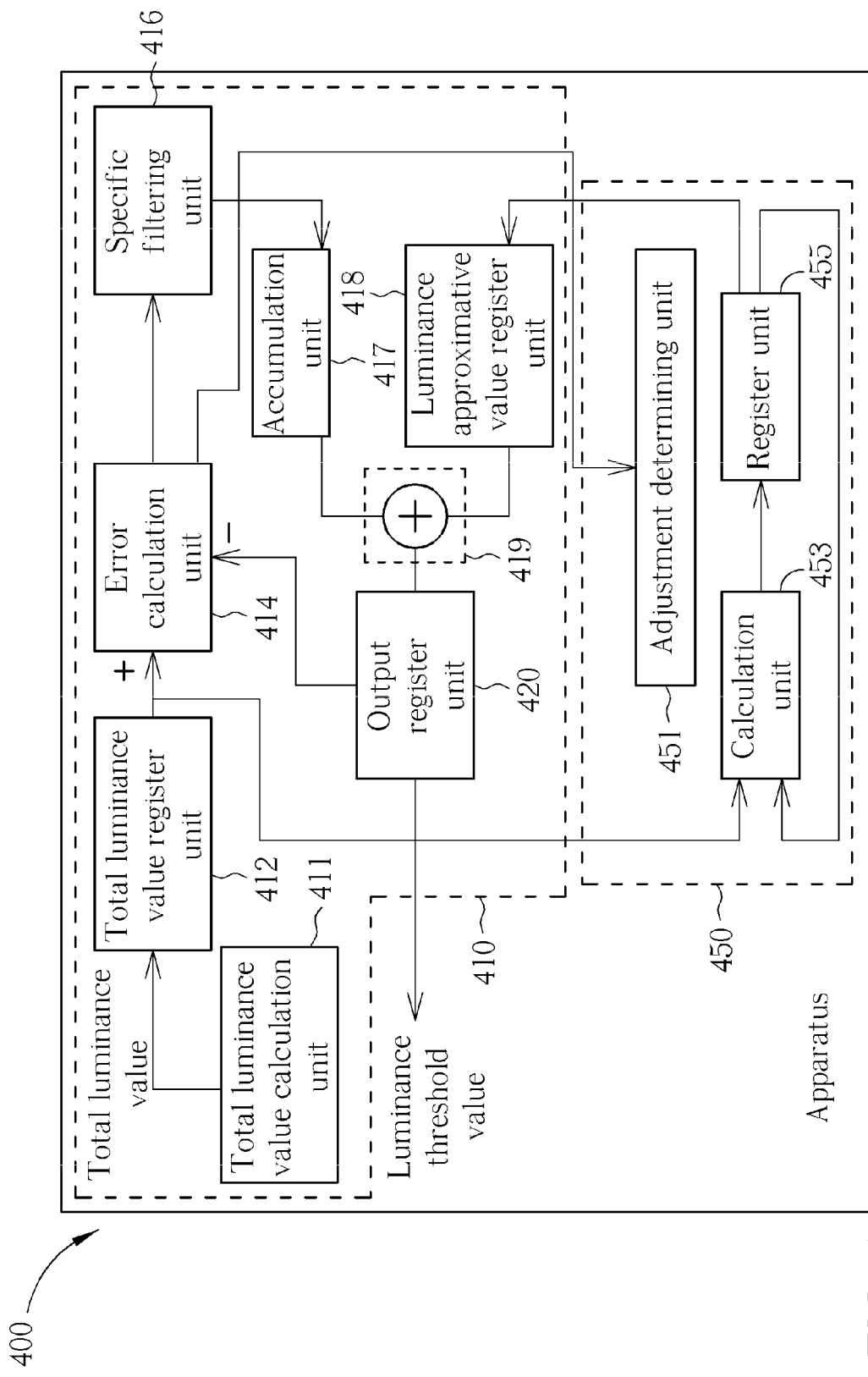
FIG. 4 is a block diagram of an apparatus according to one exemplary embodiment of the present invention.

Please refer to FIG. 4, which depicts a block diagram of an apparatus according to one exemplary embodiment of the present invention. As shown in FIG. 4, an apparatus 400 is employed for generating and updating a luminance threshold value of a video region. The apparatus 400 includes a PLL circuit 410 and a luminance approximative value adjustment circuit 450. During the operation period of the apparatus 400, luminance threshold value generation operations are continually performed to adaptively update the luminance threshold value so that the changes of the background model of the video region can be appropriately reflected. The luminance threshold value will be utilized in motion detection. The PLL circuit 410 updates the luminance threshold value according to a total luminance value of the video region and a luminance approximative value. The luminance approximative value adjustment circuit 450 is utilized for outputting the luminance approximative value and adjusting the luminance approximative value so that the PLL circuit 410 can correctly update the luminance threshold value. In this exemplary embodiment, the PLL circuit 410 comprises a total luminance value calculation unit 411, a total luminance value register unit 412, an error calculation unit 414, a specific filtering unit 416, an accumulation unit 417, a luminance approximative value register unit 418, an update processing unit 419 and an output register unit 420. In addition, the luminance approximative value adjustment circuit 450 comprises an adjustment determining unit 451, a calculation unit 453, and a register unit 455.

Each time the apparatus 400 performs the luminance threshold value generation operation, the total luminance value calculation unit 411 generates a total luminance value of the video region according to the current luminance values of all pixels in the video region. The total luminance value is temporarily stored in the total luminance value register unit 412. Then, the total luminance value is input into the error calculation unit 414, and a current luminance threshold value (which is the luminance threshold value generated in the previous luminance threshold value generation operation) stored in the output register unit 420 is subtracted from the total luminance value by the error calculation unit 414 to generate a luminance error value. Then, the luminance error value is transmitted into the specific filtering unit 416, and a specific filtering operation is performed to generate a filtered luminance error value. In one exemplary embodiment, the specific filtering unit 416 is a low-pass filter and the specific filtering operation is a low-pass filtering operation. However, this is just for explanatory purposes, and is not meant as a limitation of the present invention. Moreover, the filtered luminance error value is input into the accumulation unit 417, and is accumulated together with the filtered luminance error value generated in the previous luminance threshold value generation operation(s), (wherein there could be one or more filtered luminance error value(s)) to generate an accumulation result. It should be noted that when the luminance threshold value generation operations are continually performed, the accumulation unit 417 accumulates the newly filtered luminance error value together with the previous accumulation result in order to make the accumulation result respond to the changes of the current total luminance value. Then, the current accumulation result and a current luminance approximative value temporarily stored in the luminance approximative value register unit 418 will be processed together by the update processing unit 419 to update the current luminance threshold value stored in the output register unit 420 in order to be regarded as the luminance threshold value of this luminance threshold value generation operation. In this exemplary embodiment, the update processing unit 419 is an adder, and is utilized for adding the accumulation result to the current luminance approximative value in order to update the current luminance threshold value temporarily stored in the output register unit 420.

The generation and adjustment regarding the luminance approximative value is detailed here. In a specific luminance threshold value generation operation, the luminance approximative value adjustment circuit 450 adjusts the current luminance approximative value temporarily stored in the luminance approximative value register unit 418 according to the luminance error value generated by the error calculation unit 414. More clearly, via the adjustment determining unit 451, it is determined whether or not the current luminance approximative value is to be adjusted. If the value is to be adjusted, an averaged luminance value temporarily stored in the register unit 455 is input into the luminance approximative value register unit 418 in order to adjust the current luminance approximative value. When the averaged luminance value temporarily stored in the register unit 455 has already been input into the luminance approximative value register unit 418, the content in the register unit 455 is reset as zero and the PLL circuit 410 is simultaneously re-activated for approximating to the total luminance value. Once the content in the register unit 455 is reset as zero, the calculation unit 453 will perform an average calculation upon the current total luminance value temporarily stored in the total luminance value register unit 412 and the content stored in the register unit 455 (which is zero due to the previous resetting), and the averaged calculation value is then stored into the register unit 455 to update the content in the register unit 455. The average calculation is continually performed until a next time the adjustment determining unit 451 asks the register unit 455 to update the luminance approximative value register unit 418. When the operation of updating the luminance approximative value register unit 418 is completed, the PLL circuit 410 will be re-activated and the above-mentioned operations will be repeated to continually update the register unit 455. In short, the present invention utilizes the calculation unit 453 to generate the averaged luminance value, utilizes the averaged luminance value to update the current luminance calculation value stored in the register unit 455, and further utilizes the adjustment determining unit 451 to properly determine the timing of updating the luminance approximative value register unit 418 and the activation of the PLL circuit 410. These operations all fall within the scope of the present invention.

Figure 5:
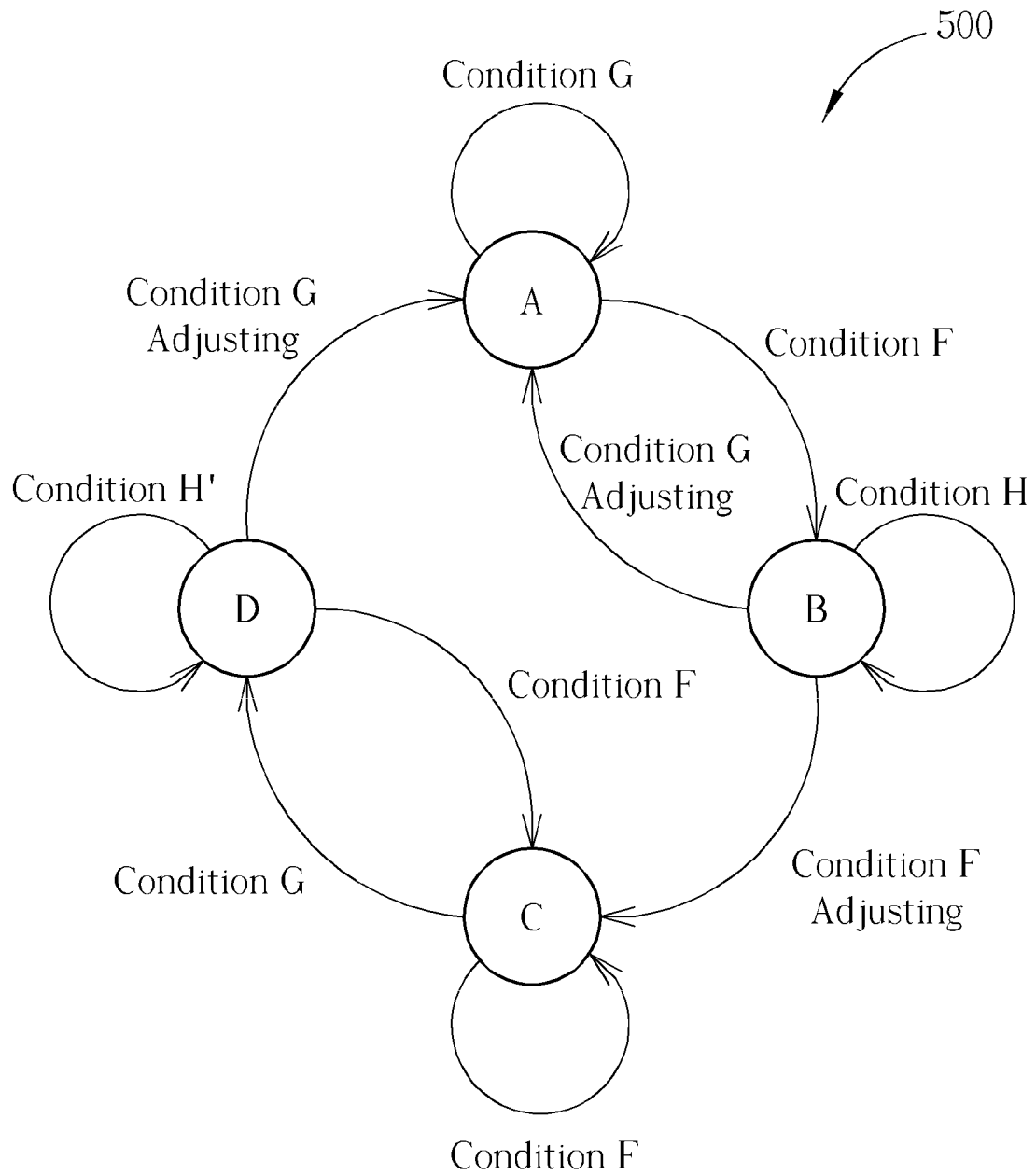
FIG. 5 is a diagram showing a state machine utilized in the adjustment determining unit shown in FIG. 4 according to one exemplary embodiment of the present invention.

The determination of whether the adjustment determining unit 451 adjusts the luminance approximative value is further detailed here. Please refer to FIG. 4 and FIG. 5 simultaneously. FIG. 5 depicts a diagram of a state machine employed by the adjustment determining unit 451 shown in FIG. 4 that determines whether to adjust the luminance approximative value according to one exemplary embodiment of the present invention. As shown in FIG. 5, a state machine 500 has (but is not limited to) four states: state A, state B, state C, and state D. Transitions between states occur according to the conditions shown in FIG. 5, wherein condition F represents that the luminance error value falls within a predetermined numerical value range, condition G represents that the luminance error value does not fall within the predetermined numerical value range, condition H represents that all of the luminance error values generated in a predetermined number of times of luminance threshold value generation operations fall within the predetermined numerical value range, and condition H' represents that none of the luminance error value generated in a predetermined number of times of luminance threshold value generation operations falls within the predetermined numerical value range.

Please note that the above-mentioned conditions are just for explanatory purposes, and are not meant as limitations. For example, in other embodiments, the predetermined numerical value ranges described respectively in condition F and condition G could be two different predetermined numerical value ranges, and the predetermined numbers described respectively in condition H and condition H' could be two different predetermined numbers. In brief, at three different states (which are state B, C, and D), once condition F is satisfied, the state will ultimately transfer to state C. At three other different states (which are state A, B, and D), once condition G is satisfied, the state will ultimately transfer to state A. As far as conditions F and G are concerned, the main difference between condition F and G is whether the luminance error value generated meanwhile falls within a predetermined numerical value range, which is used as a determination of whether the generated luminance threshold value can properly respond to the total luminance value. Thus, when condition F is satisfied, it represents that the difference between the current luminance threshold value and the current total luminance value is relatively small. When condition G is satisfied, it represents that the difference between the current luminance threshold value and the current total luminance value is relatively high. In contrast to condition A, condition C is the state where the current luminance threshold value can reflect the changes of the total luminance value more properly. To ensure that the total luminance value becomes steady before entering state C, condition H determines whether all the luminance error values respectively generated in a predetermined number of times of luminance threshold value generation operations fall within the predetermined numerical value range so that the error between the luminance threshold value and the total luminance value keeps within a steady range. Once condition H is satisfied, the total luminance value is considered as being at a steady state. Thus, during the transition from state B to state C, the adjustment determining unit 451 determines to adjust the current luminance approximative value stored in the luminance approximative value register unit 418 by the current averaged luminance value stored in the register unit 455 in order to make the current luminance approximative value be closer to the numerical value level of the current total luminance value. The staying at state B caused by condition H ensures that the luminance approximative value responds to the total luminance value only when the total luminance value is steady. Therefore, it is certain that the changes of the total luminance value are indeed caused by the changes of the background.

On the other hand, if the state machine 500 enters state A, there are two transitions that will cause the adjustment determining unit 451 to adjust the current luminance approximative value stored in the luminance approximative value register unit 418 so that the current averaged luminance value stored in the register unit 455 is utilized for updating the current luminance approximative value stored in the luminance approximative value register unit 418. The first transition is the transition from state D to state A, and the second is the transition from state B to state A. Since state A is the state where the current luminance threshold value is very different from the current total luminance value, the luminance approximative value is adjusted to a level closer to the current luminance approximative value in advance before entering state A so that the luminance threshold value can be closer to the total luminance value after entering state A.

Similarly, to ensure that the difference between the current luminance threshold value and the current total luminance value is obtained only when the total luminance value is steady, a condition H' is configured at state D. Thus, after waiting for a longer period, if all the luminance error values generated during the period fall within the predetermined numerical value range, the total luminance value must already be steady, and the level of the luminance approximative value can be adjusted again so that the generated luminance threshold value can reflect the background model more properly. At this time, the current luminance approximative value is adjusted by the current averaged luminance value, which makes the current luminance approximative value closer to the current total luminance value (since the current averaged luminance value is obtained by repeatedly averaging total luminance values generated in a plurality of luminance threshold value generation operations); also the current averaged luminance value stored in the register unit 435 is reset, and the numerical value level of the total luminance value will be again estimated in the luminance threshold value generation operation after adjustment. Through the foregoing operations, the current averaged luminance value can be closer to the current total luminance value.

Please note that the state machine 500 shown in FIG. 5 is just one explanatory embodiment. In other words, any other means (e.g. a modified state machine or other technique that can achieve the same effect) that can realize the feature of the present invention still fall within the scope of the present invention. In order to describe the feature of the state machine used in the above-mentioned exemplary embodiment more exactly, the cause and effect of the luminance error value and the number of times of the luminance threshold value generation operations already performed is further described in the following. First of all, when the luminance error value generated in the specific luminance threshold value generation operation does not fall within a predetermined numerical value range, and before the specific luminance threshold value generation operation is performed at least one generated luminance error value falls within the predetermined numerical value range, the luminance approximative value is adjusted (which corresponds to the luminance approximative value adjustment occurring in the transition from state B to state A in the state machine 500 shown in FIG. 5). Furthermore, when the luminance error value generated in the specific luminance threshold value generation operation falls within a predetermined numerical value range, and before the specific luminance threshold value generation operation is performed all the luminance error values respectively generated in a predetermined number of times of luminance threshold value generation operations fall within the predetermined numerical value range, the luminance approximative value is adjusted (which corresponds to the luminance approximative value adjustment occurring in the transition from state B to state C in the state machine 500 shown in FIG. 5). Finally, when the luminance error value generated in the specific luminance threshold value generation operation does not fall within a predetermined numerical value range, and before the specific luminance threshold value generation operation is performed none of the luminance error value respectively generated in a predetermined number of times of luminance threshold value generation operations falls within the predetermined numerical value range, the luminance approximative value is adjusted (which corresponds to the luminance approximative value adjustment occurring in the transition from state D to state A in the state machine 500 shown in FIG. 5). By the descriptions of the above three conditions, the feature of the present invention is expressly explained, and includes: once the total luminance value tends to be steady, the luminance approximative value will be adjusted so that the luminance threshold value can respond to the changes of the total luminance value. On the whole, the luminance threshold value of the present invention is generated by to the luminance approximative value adjustment circuit 450 and the PLL circuit 410. The luminance approximative value adjustment circuit 450 generates and adjusts the luminance approximative value which is close to the numerical value level of the current total luminance value. Then, the PLL circuit 410 performs fine tuning for the difference between the total luminance value and the luminance threshold value so that the generated luminance threshold value can respond the changes of the background model more truly.

Figure 6:
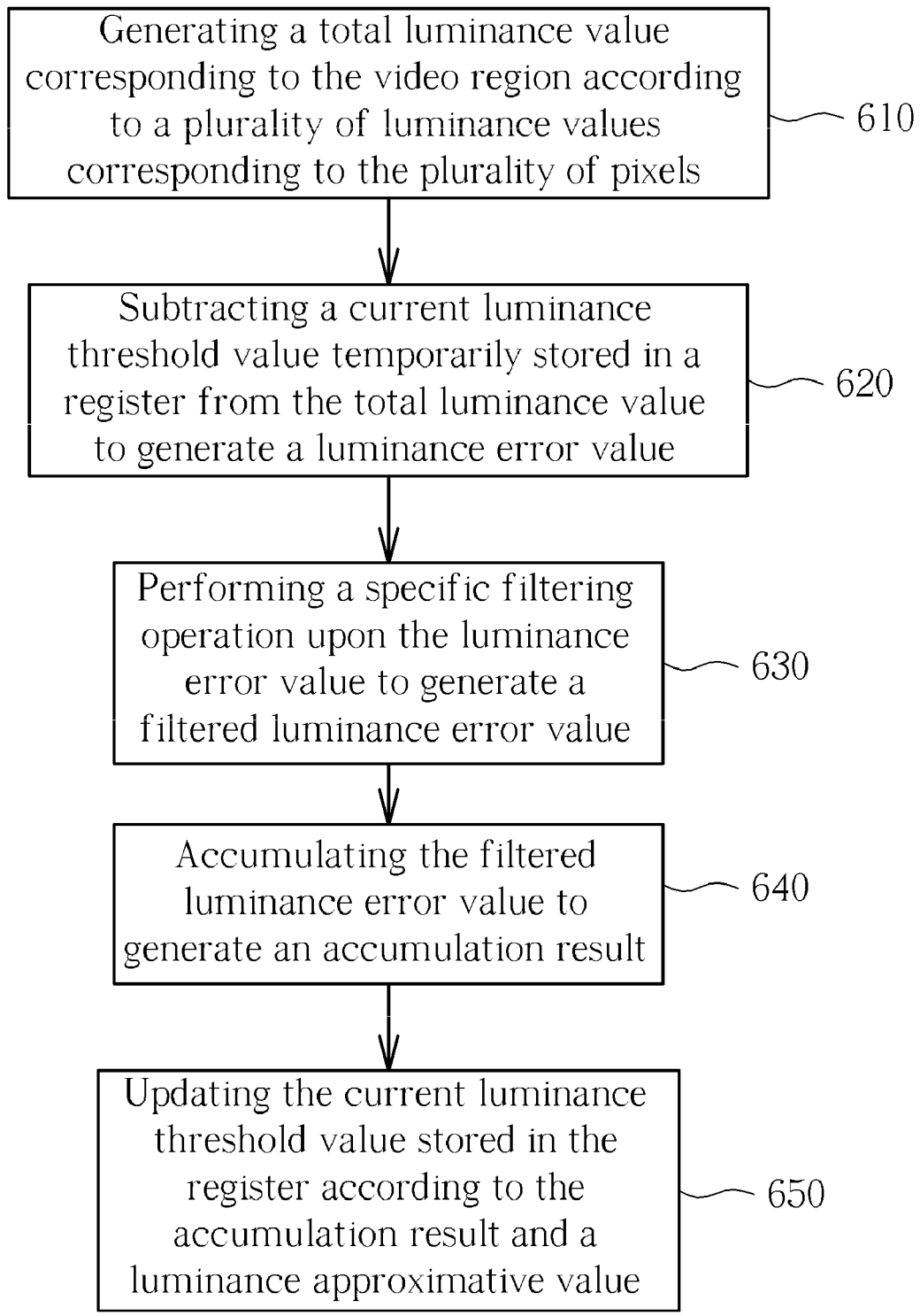
FIG. 6 is a flow chart showing a method according to one exemplary embodiment of the present invention.

According to the above-mentioned exemplary embodiment, the method of the present invention can be summarized as follows. Firstly, the method of the present invention includes respectively performing a plurality of luminance threshold value generation operations upon a video region between a plurality of video frames. Each luminance threshold value generation operation includes: generating a total luminance value corresponding to the video region according to a plurality of luminance values corresponding to the plurality of pixels; subtracting a current luminance threshold value temporarily stored in a register from the total luminance value to generate a luminance error value; performing a specific filtering operation upon the luminance error value to generate a filtered luminance error value; accumulating the filtered luminance error value to generate an accumulation result; and updating the current luminance threshold value stored in the register according to the accumulation result and a luminance approximative value. Since the flow chart of each luminance threshold value generation operation has already been illustrated in FIG. 6 and the explanation of each step has also been described in the pertinent description, the detailed descriptions are omitted here for the sake of brevity.

In conclusion, among the actual problems encountered by motion detection technique, not all of the changes of the total luminance value relate to the changes of the background model. Thus, to effectively exclude the total luminance value change caused by noises or non-background model changes, the method and the apparatus of the present invention have an emphasis on the immunity to the changes of total luminance value caused by these factors. Therefore, in an exemplary embodiment of the present invention, by designing the state machine, the present invention can postpone the PLL tracking of the total luminance value. As a result, the present invention can assure that only changes in the background model are considered for generating the luminance threshold value. However, any other method that can delay the total luminance value response of the PLL without using a state machine is also a modification of the present invention and therefore falls within the scope of the present invention.

Those skilled in the art will readily observe that numerous modifications and alterations of the device and method may be made while retaining the teachings of the invention.

What is claimed is:

1. A method for determining a luminance threshold value of a video region, the video region including a plurality of pixels, each pixel corresponding to a luminance value, comprising:
respectively performing a plurality of luminance threshold value generation operations upon the video region between a plurality of video frames, wherein each luminance threshold value generation operation comprises:
generating a total luminance value corresponding to the video region according to a plurality of luminance values corresponding to the plurality of pixels;
subtracting a current luminance threshold value temporarily stored in a register from the total luminance value to generate a luminance error value;
performing a specific filtering operation upon the luminance error value to generate a filtered luminance error value;
accumulating the filtered luminance error value to generate an accumulation result; and
updating the current luminance threshold value stored in the register according to the accumulation result and a luminance approximative value.

2. The method of claim 1, wherein the specific filtering operation is a low-pass filtering operation.

3. The method of claim 1, further comprising:
determining whether to adjust the luminance approximative value according to the luminance error value generated in a specific luminance threshold value generation operation of the plurality of luminance threshold value generation operations.

4. The method of claim 3, wherein the step of determining whether to adjust the luminance approximative value comprises:
determining to adjust the luminance approximative value when the luminance error value generated in the specific luminance threshold value generation operation does not fall within a predetermined numerical value range wherein before the specific luminance threshold value generation operation is performed at least one luminance error value generated in luminance threshold value generation operation falls within the predetermined numerical value range.

5. The method of claim 3, wherein the step of determining whether to adjust the luminance approximative value comprises:

determining to adjust the luminance approximative value when the luminance error value generated in the specific luminance threshold value generation operation falls within a predetermined numerical value range, wherein before the specific luminance threshold value generation operation is performed all of the luminance error values respectively and continuously generated in a predetermined number of times of luminance threshold value generation operations fall within the predetermined numerical value range.

6. The method of claim 3, wherein the step of determining whether to adjust the luminance approximative value comprises:
determining to adjust the luminance approximative value when the luminance error value generated in the specific luminance threshold value generation operation does not fall within a predetermined numerical value range, wherein before the specific luminance threshold value generation operation is performed none of the luminance error values respectively and continuously generated in a predetermined number of times of luminance threshold value generation operations fall within the predetermined numerical value range.

7. The method of claim 3, wherein each luminance threshold value generation operation further comprises:
generating a calculation result by performing a specific calculation upon the total luminance value and a luminance calculation value generated in the previous luminance threshold value generation operation in order to update the luminance calculation value;
and the method further comprises:
when determining to adjust the luminance approximative value according to the luminance error value generated in the specific luminance threshold value generation operation, utilizing the calculation result to update the luminance approximative value, and resetting the luminance calculation value.

8. The method of claim 7, wherein the specific calculation is an average calculation.

9. The method of claim 1, further comprising:
determining an initial value corresponding to the luminance approximative value by performing a specific calculation upon the total luminance value generated in the first luminance threshold generation operation.

10. The method of claim 9, wherein the specific calculation is an average calculation, and the initial value is an averaged luminance value.

11. An apparatus for determining a luminance threshold value of a video region, the video including a plurality of pixels, each pixel corresponding to a luminance value, the apparatus respectively performing a plurality of luminance threshold value generation operations upon the video region between a plurality of video frames, the apparatus comprising:
a total luminance value calculation unit, for generating a total luminance value corresponding to the video region in each luminance threshold value generating operation according to a plurality of luminance values of the plurality of pixels;
a total luminance value register unit, coupled to the total luminance value calculation unit, for temporarily storing the total luminance value generated by the total luminance value calculation unit;
an error calculation unit, coupled to the total luminance value register unit, for subtracting a current luminance threshold value temporarily stored in an output register unit from the total luminance value to generate a luminance error value;
a specific filtering unit, coupled to the error calculation unit, for performing a specific filtering operation upon the luminance error value to generate a filtered luminance error value;
an accumulation unit, coupled to the specific filtering unit, for accumulating the filtered luminance error value to generate an accumulation result;
an update processing unit, coupled to the accumulation unit, for updating the current luminance threshold value stored in an output register according to the accumulation result and a luminance approximative value; and
an output register unit, coupled to the update processing unit, for temporarily storing the current luminance threshold value generated in each luminance threshold value generation operation.

12. The apparatus of claim 11, wherein the specific filtering unit is a low-pass filter.

13. The apparatus of claim 11, further comprising:
a luminance approximative value outputting circuit, coupled to the update processing unit, for generating the luminance approximative value into the update processing unit and determining whether to adjust the luminance approximative value according to the luminance error value generated in a specific luminance threshold value generation operation of the plurality of luminance threshold value generation operations performed by the apparatus.

14. The apparatus of claim 13, wherein the luminance approximative value outputting circuit comprises:
an adjustment determining unit, for adjusting the luminance approximative value when the luminance error value generated in the specific luminance threshold value generation operation performed by the apparatus does not fall within a predetermined numerical value range, wherein before the specific luminance threshold value generation operation is performed by the apparatus at least one luminance error value generated in the luminance threshold value generation operation falls within the predetermined numerical value range.

15. The apparatus of claim 13, wherein the luminance approximative value outputting circuit comprises:
an adjustment determining unit, for adjusting the luminance approximative value when the luminance error value generated in the specific luminance threshold value generation operation performed by the apparatus falls within a predetermined numerical value range, wherein before the specific luminance threshold value generation operation is performed by the apparatus all of the luminance error values respectively and continuously generated in a predetermined number of times of luminance threshold value generation operations performed by the apparatus fall within the predetermined numerical value range.

16. The apparatus of claim 13, wherein the luminance approximative value outputting circuit comprises:
an adjustment determining unit, for adjusting the luminance approximative value when the luminance error value generated in the specific luminance threshold value generation operation performed by the apparatus does not fall within a predetermined numerical value range, wherein before the specific luminance threshold value generation operation is performed by the apparatus none of the luminance error values respectively and continuously generated in a predetermined number of luminance threshold value generation operations performed by the apparatus fall within the predetermined numerical value range.

17. The apparatus of claim 13, wherein the luminance approximative value outputting circuit further comprises:
- a specific register unit, for temporarily storing a luminance calculation value generated in each luminance threshold value generation operation; and
- a specific calculation unit, coupled to the total luminance value register unit and the specific register unit, for performing a specific calculation upon the total luminance value temporarily stored in the total luminance value register unit and the luminance calculation value temporarily stored in the specific register unit to generate a calculation result, and utilizing the calculation result to update the luminance calculation value temporarily stored in the specific register unit;

wherein the luminance approximative value outputting circuit further utilizes the calculation result for updating the luminance approximative value, and resetting the luminance calculation value when determining to adjust the luminance approximative value according to the luminance error value generated in the specific luminance threshold value generating operation performed by the apparatus.

18. The apparatus of claim 17, wherein the specific calculation unit is an averaging calculation unit, and the luminance calculation value is an averaged luminance value.

19. The apparatus of claim 11, wherein the luminance approximative value outputting circuit further determines an initial value corresponding to the luminance approximative value by performing a specific calculation upon the total luminance value generated in the first luminance threshold generation operation.

20. The apparatus of claim 19, wherein the specific calculation is an averaging calculation, and the initial value is an averaged luminance value.

* * * * *